United States Patent
Hofenauer et al.

(10) Patent No.: US 8,048,544 B2
(45) Date of Patent: Nov. 1, 2011

(54) CERAMICS MADE OF PRECERAMIC PAPER OR BOARD STRUCTURES, METHOD OF PRODUCING THE SAME AND USE THEREOF

(75) Inventors: Andreas Hofenauer, Eichenau (DE); Renate Kirmeier, Munich (DE); Ralf Markusch, Munich (DE); Hans Windsheimer, Nuremberg (DE); Nahum Travitzky, Nürnberg (DE); Peter Greil, Weisendorf (DE)

(73) Assignee: Papiertechnische Stiftung Munchen, Munich (DE)

( * ) Notice: Subject to any disclaimer, the term of this patent is extended or adjusted under 35 U.S.C. 154(b) by 500 days.

(21) Appl. No.: 12/083,412

(22) PCT Filed: Aug. 28, 2006

(86) PCT No.: PCT/EP2006/008405
§ 371 (c)(1),
(2), (4) Date: Aug. 5, 2008

(87) PCT Pub. No.: WO2007/042105
PCT Pub. Date: Apr. 19, 2007

(65) Prior Publication Data
US 2009/0011208 A1    Jan. 8, 2009

(30) Foreign Application Priority Data

Oct. 12, 2005 (DE) .................. 10 2005 048 785
May 15, 2006 (DE) .................. 10 2006 022 598

(51) Int. Cl.
*B32B 9/00* (2006.01)
*C04B 35/10* (2006.01)
*C04B 35/14* (2006.01)

(52) U.S. Cl. ........ 428/703; 428/219; 428/220; 428/325; 428/332; 428/334; 427/376.1; 501/134; 501/153; 501/53; 501/87; 501/88

(58) Field of Classification Search ............ 428/219, 428/220, 325, 332, 334, 703
See application file for complete search history.

(56) References Cited

U.S. PATENT DOCUMENTS

| | | |
|---|---|---|
| 3,634,250 A | 1/1972 | Commons |
| 4,383,890 A | 5/1983 | Oshima et al. |
| 4,421,599 A * | 12/1983 | Kuzuoka et al. ............ 162/100 |

FOREIGN PATENT DOCUMENTS

| | | |
|---|---|---|
| AU | 605179 | 1/1991 |
| DE | 10348798 | 6/2005 |
| JP | 57-156376 | 9/1982 |
| JP | 63-172742 | 7/1988 |
| JP | 63-268214 | 11/1988 |
| JP | 3-253305 | 11/1991 |
| JP | 2001-291448 | 10/2001 |
| JP | 2005-47014 | 2/2005 |

* cited by examiner

*Primary Examiner* — Gwendolyn Blackwell
(74) *Attorney, Agent, or Firm* — Dilworth & Barrese, LLP.

(57) ABSTRACT

Ceramics are made of preceramic paper or board structures in a particular shape previously represented in a paper structure, in which the preceramic papers or boards have a content of ceramic fillers between 30 and 95 wt-%, with the ceramic fillers having a particle size <30 μm. A method for manufacturing such ceramics and the use thereof are also provided.

39 Claims, 5 Drawing Sheets

15 kV    x300    50μm    PTS 10 kV    x200    100μm    PTS 15 kV    x300    50μm    PTS 15 kV    x400    50μm    PTS 15 kV     x300     50μm     PTS

HV   Spot   Mag   Det   WD      300.0μm
20.0 kV   4.0   400x   SSD   11.1 mm    SiC paper, pyrolyzed, LVS 25, LK3

CERAMICS MADE OF PRECERAMIC PAPER OR BOARD STRUCTURES, METHOD OF PRODUCING THE SAME AND USE THEREOF

BACKGROUND OF THE INVENTION

This invention relates to a ceramics made of preceramic paper or board structures, a method of producing such ceramics and the use thereof.

In the art, porous ceramic articles are used for numerous applications, for instance heat-insulating structures, kiln furniture, porous burner substrates and fire protection structures. Another application is in the field of catalyst supports.

It is known already to dip articles of corrugated board or other paper structures into a slip of metallic or ceramic powders, whereby an external coating is effected (H. Sieber, T. Fey, D. Schwarze, M. Weidner and M. Kresch: "Herstellung von porösen Keramiken aus Papierstrukturen", in "Das Keramikjahrbuch 2002", editor: H. Reh, Göller Verlag, Baden-Baden/Germany, pp. 47-54 (2003)). The correspondingly dipped papers then are subjected to pyrolysis in inert gas and to a subsequent temperature treatment in air at 1400° C. With this procedure, high-temperature resistant, cellular ceramics of comparatively low weight are obtained already. It is a disadvantage of the prior art method that on the one hand the coating to be performed is comparatively expensive. Furthermore, coating with the reactive substances is not possible inside the paper structure. Moreover, coating only is possible with articles that can be dipped. However, this excludes any kind of hollow articles, into which the slip cannot penetrate. Furthermore, when coating fine structures, such as a fine flute in the corrugated board, a uniform coating of the surface by dipping into the slip no longer is ensured.

SUMMARY OF THE INVENTION

It is the object of the invention to provide a ceramics of preceramic paper or board structures in a particular shape previously represented in a paper structure, by means of which possibly any kind of article can be produced.

In accordance with the invention, this object is solved by a ceramics with the features herein.

Accordingly, a ceramics made of preceramic paper and board structures is created in a particular shape previously represented in a paper structure, in which the preceramic papers or boards have a content of ceramic fillers between 30 and 95 wt-%, the ceramic fillers having a particle size <30 µm.

In accordance with the invention, "filled papers" or "filled boards" thus are produced, which for the most part are enriched with a ceramic filler.

Advantageously, the ceramics can constitute a composite ceramics in the form of a previously represented paper or board structure.

Fillers used in the ceramics can be selected from a group including the following substances: carbides, nitrides, oxides, borides and/or zeolites.

Particularly useful fillers include $Al_2O_3$, $ZrO_2$, SiC, $Si_3N_4$, $TiO_2$, $B_4C$, TiC, $TiB_2$ and mixtures thereof and/or glasses such as alumosilicates.

In order to increase the retention of the fillers in the preceramic paper or board, i.e. to provide for a high loading of the preceramic paper or board with the fillers, charged latex or charged starch in combination with a charged polymer are incorporated in the mixture in accordance with a particularly advantageous aspect of the invention. The amount of latex in the preceramic paper or board is between 0.2 and 15 wt-%.

The amount of polymer in the preceramic paper or board advantageously is between 0.05 and 5 wt-%.

As reinforcing elements, ceramic fibers can be added.

As fibrous material, any kind of pulp, such as sulfate pulp, sulfite pulp, TMP and/or CTMP can be used. The thickness of the preceramic paper structure advantageously lies in the range from 50 to 500 µm. The weight of the preceramic paper structure lies in the range from 100 to 500 g/m².

It is also possible to produce preceramic board structures which are comparatively thick-walled and thus for instance have a thickness of up to about 50 mm.

In accordance with the invention, the above-described ceramics is produced by the following method:

mixing fibrous material and filler, processing to obtain a paper or a board, subjecting the paper or board produced to pyrolysis at temperatures up to 1200° C. and/or sintering at temperatures between 1000° C. and 2000° C.

Advantageously, the raw paper or raw board produced is subjected to a forming step prior to the pyrolysis step, for instance to fluting or corrugating.

Advantageously, the individual layers of papers or boards can be couched, in order to obtain thicker layers. Particularly advantageously, ceramic papers or boards of different structures can be couched together. In this way, an alternately layered ceramics can be produced. The preceramic paper or board thus produced additionally can be coated with ceramic slips by means of an established paper coating technique. The objective is to produce multilayer systems. In the green or sintered condition of the preceramic paper or board, layers can be applied by means of the sol-gel technique.

The preceramic paper or board can be processed by means of established paper forming techniques or board forming techniques, in order to thus produce a thin-walled structural ceramics of possibly complex shape. It is particularly advantageous that here the use of paper joining techniques is possible.

Comparatively thick-walled boards can be produced for instance by means of multilayer couching, twin-wire presses or wet machines.

These boards can thermally be converted into plate-like ceramic products. Such large-surface ceramic plates are of great interest for instance as lining elements of line constructions under a chemical, mechanical or thermal load.

In the thermal conversion, a conversion or removal of the pulp and of the latex initially is effected by means of pyrolysis and oxidation. Subsequently, sintering is effected under inert conditions or in air, depending on the ceramic system.

For pyrolysis and the binder removal process, temperatures up to about 1200° C. are required, wherein the pyrolysis is effected under inert conditions (e.g. nitrogen atmosphere) and the binder removal process is effected under air or oxygen. For the sintering process, however, temperatures between 1000° C. and 2000° C. should be maintained.

Depending on the starting mixture, both dense and porous ceramics can be realized. The microstructure of the resulting ceramics then can be adjusted in a wider range via the pulp and hence after a corresponding pyrolysis via the remaining cavities, the filler content, the particle size distribution of the filler, the degree of compaction or the type or amount of further additives, such as long or short ceramic fibers, fibrous tissue, platelets, whiskers and/or organic fibers (as wildcards) of the paper.

By means of a corresponding thermal conversion of paper structures, three-dimensional ceramic structures of complex shape can be realized.

Advantageous uses of the ceramics of the invention can be taken from the description herein. In gas separation or liquid filtration, the ceramics of the invention can be used advantageously. Such ceramic membranes are employed in micro-, ultra- and nanofiltration. Here, flat, large-surface filter constructions are desired, which cannot be realized by means of conservative methods such as extrusion. The advantage of the use of the aforementioned method of the invention consists in that large-surface, thin ceramic substrates can be produced and be realized by paper coating methods in multilayer systems. The thickness of the ceramic substrates here is below 500 µm with papers, but up to 50 mm with boards.

Another field of application in accordance with the invention consists in the use as porous burner. Ceramic porous burner systems can be used in a novel temperature range up to much higher temperatures than metallic systems. Here, about 2000° C. are achieved with ceramic systems. The pore size of such burner systems lies in the range between 2 and 6 mm. Beside foam structures, wave structures can also be used. Such wave structures can effectively be achieved with paper forming techniques.

Finally, an inventive use of the present invention exists in the field of thin-walled and dense structural ceramics. Thin-walled or dense ceramic elements are of great interest for instance as components for ceramic heat exchangers.

By using suitable connecting layers, laminate ceramics can also be produced from the preceramic papers or boards in accordance with the invention.

Here, advantageously layered material convertible into ceramics is bonded/connected by the connecting layers and converted into ceramics during a subsequent temperature treatment, whereby a permanent, firm and temperature-resistant connection between the material layers converted into ceramics and the connecting layers likewise converted into ceramics is achieved.

Laminate bodies of ceramics are quite established in the art, but the manufacture thereof sometimes requires a great technical effort. Techniques such as hot-pressing slip-infiltrated and impregnated fiber blanks are used in the production of ceramic composite materials. However, such methods mostly are greatly restricted in the geometry of the components to be produced due to the use of a cold/hot-pressing step; here, only simple geometries such as plates can be realized.

An innovative step for manufacturing components of complicated shape is the use of rapid prototyping methods. By means of such methods, technical components can be manufactured without a mold. For such purpose, the Laminated Object Manufacturing Method (LOM method) is particularly useful, as comparatively large components can be manufactured therewith. As starting materials, paper webs are used for instance, which are laminated mechanically under the influence of temperature and pressure and subsequently are cut to size. The adhesive provided on the bottom surface of the paper layers briefly is molten by temperature and pressure and provides a permanent connection of the paper layers upon solidification. With a cutting means, the component contour is cut into each material layer, and in this way, the component is additively generated layer by layer.

If a ceramizable flat substrate, such as e.g. ceramic films or preceramic papers or boards, is used as starting material of the LOM method, ceramic components can very easily be manufactured in this way. As this process can do without the use of a forming pressing or casting tool ("mold"), any kind of complicated components can be manufactured quickly and at low cost.

In the connecting layers of the present invention, polymer-based adhesive compounds are used for layered ceramic components (laminate ceramics). Since thermoplastic/thermosetting adhesives are thermally decomposed at high temperatures (>800° C.), as they are used for consolidating a molded ceramic article, adhesives must be used, which are composed such that they provide a high enough residue at high temperatures.

Therefore, one component of the connecting layer of the invention is a powdery polymer solid at room temperature, which is softened under the influence of heat and is solidified again upon termination of the influence of heat. Silicone or phenol resins, which exhibit a thermoplastic behavior up to the cross-linking temperature, can also be used. The ceramic yield after a temperature treatment is adjusted by incorporating fillers. Accordingly, the starting polymer is homogeneously enriched with filler particles, advantageously with grain sizes smaller than 50 µm.

Advantageously, the filler particles used are ceramizable filler particles, and hence the connecting layer likewise is ceramizable.

The amount of filler particles incorporated advantageously can be up to 90 wt-%, based on the dry weight of the polymer used.

The use of the dry connecting layer with ceramic yield provides for connecting ceramic surfaces by briefly softening and solidifying.

This provides ceramizable connecting layers, which after a coating step undergo a permanent connection with the corresponding substrate materials and with which several substrate layers can be connected under the influence of temperature. After a high-temperature treatment, said connecting layers have a ceramic yield which can be influenced by the amount of ceramic fillers added.

Layer materials coated with the adhesive layer of the invention then can be laminated among other things, but not only, by the LOM method for the purpose of manufacturing components. There are obtained components with a layered structure, which are schematically represented in FIG. 1. By a corresponding choice of the composition, thickness and porosity of substrate and adhesive layer, graded structures (functionally graded materials, FGM) can also be obtained among other things.

In addition, the adhesive bond of the invention has a wide field of application in ceramic technology, e.g. for connecting or fixing catalyst parts, soot particle filters or as fixing aid for furnace linings. When choosing corresponding starting materials, the present invention also allows a use in fuel cell technology for providing electrolyte layers. A further field of application of the invention is the application as an abrasion or oxide protection layer on substrates to be protected correspondingly, which are not necessarily flat substrates.

Advantageously, thermoplastic polymers such as polyacrylates, polyurethanes, polyethylenes and copolymers thereof are used as starting materials. Prior to application on the corresponding substrate, the polymer used can be present as a dispersion or solution in a liquid medium. Mixtures of the aforementioned polymers can also be used.

Advantageously, the ceramizable connecting layers are adjusted to the ceramics of the layers to be connected in terms of their material composition.

The invention allows to provide a firm, permanent coherence between individual ceramized layers. The invention also allows to adapt the properties of the filling layer to the properties of the material of the ceramic layers to be bonded by correspondingly choosing the composition of the filling material. The laminates thus obtained then are converted to ceramics by a temperature treatment, wherein both the material layers and the intermediate layers provided by the invention are converted to ceramics.

In addition, the connecting layers can technically easily be applied onto flat precursors, which can then be laminated.

Metals/semimetals of main groups II to IV, of the subgroups including lanthanides and alloys thereof, and their crystalline and amorphous compounds with non-metals of the second period (excluding fluorine and neon) of the Periodic Table preferably can be used as filler particles.

Mixtures and mixed compounds of these substances, such as alumosilicates, glasses and the like, likewise can be used as filler particles.

The filler particles of the connecting layer can be adjusted to the type of ceramics to be produced; in the case of oxidic ceramics, oxidic filler particles can be used, and in the case of carbidic ceramics, carbidic filler particles can be used.

When preparing the adhesive compound forming the connecting layer, processing aids such as dispersing agents and defoaming agents can be added, advantageously in a range from 0 to 2 wt-% each.

The connecting layer can be applied onto the substrate to be coated with all techniques used in coating technology, such as e.g. screen printing, pad printing or spraying. Paper webs can for instance be coated by means of brushing; technologies such as spreading powders and subsequently melting the same can also be used. The layer thicknesses achieved preferably lie in a range from 1 to 500 µm.

After coating the substrate with the adhesive compound, substrates can be laminated, wherein the adhesive compound briefly is heated above the glass transition temperature of the polymer or the adhesive compound, and the substrates are joined together with or without pressure, so that the surfaces of the material layers can get in contact with each other. As a result of the solidification of the adhesive compound upon cooling, the substrate layers are permanently connected.

There is obtained a laminate which includes a material layer and a connecting layer in an alternating sequence. Such laminate is characterized by at least two material layers and at least one connecting layer.

In a subsequent temperature treatment, the connecting layer is subjected to a thermal treatment, wherein the temperature treatment is performed until the polymer used no longer undergoes a change in weight, determinable by thermogravimetric analyses, and depending on polymer and atmosphere, polymer residues can be present in a range from 0 to 75 wt-%.

The base polymer either is removed completely or, in the case of a temperature treatment under an inert gas atmosphere, converted into a carbon film. When using polysiloxanes as base polymer, Si—O—C is formed correspondingly. When using polysilazanes as base polymer, an Si—O—N phase is formed correspondingly. This is advantageously effected in temperature ranges from 200-1400° C.

By means of a further temperature treatment, a ceramic intermediate layer is formed from the adhesive residue. Surface reactions take place between the pyrolysis residue, the filler particles and the substrate surfaces and combinations thereof. Advantageously, this temperature treatment takes place in temperature ranges, in which the filler particles used have an increased surface reactivity. Typically, this is effected in temperature ranges between 1000 and 2000° C.

Advantageously, both temperature treatments can be performed in one step.

The invention also is characterized in that the thickness of the connecting layer can be changed by preceding temperature treatments. Typical boundary layer thicknesses lie in the range from 0.5 µm to 200 µm.

While the above-described connecting layers advantageously are used for connecting the preceramic papers or boards in accordance with the invention, it still is quite obvious for one of skill in the art that these connecting layers can be used for connecting any ceramizable material.

BRIEF DESCRIPTION OF THE DRAWINGS

Further details and features of the invention can be taken from the following embodiments with reference to the accompanying drawings, in which.

DESCRIPTION OF THE PREFERRED EMBODIMENTS

Embodiment 1

For manufacturing an alumina paper, 15 wt-% of eucalyptus sulfate pulp initially are used as starting component, based on the sheet weight. 83 wt-% of alumina powder with a mean grain size diameter (D50) of 0.8 µm are added, based on the sheet weight. Furthermore, 2 wt-% of anionic latex based on the sheet weight are admixed, and 0.7 wt-% of a kationic polymer based on the filler (Katiofast VFH).

From this mixture, a circular laboratory sheet with a diameter of 20 cm and a weight per unit area of 380 g/m² is manufactured.

In the experiment, 360 g pulp suspension (0.5%) were mixed with 7 g Katiofast (1%). Furthermore, 19.92 g alumina slurry (50%) were added. Finally, 6 g latex emulsion (4%) were added. From this mixture, a sheet was formed, which subsequently was dried.

Figure 1:
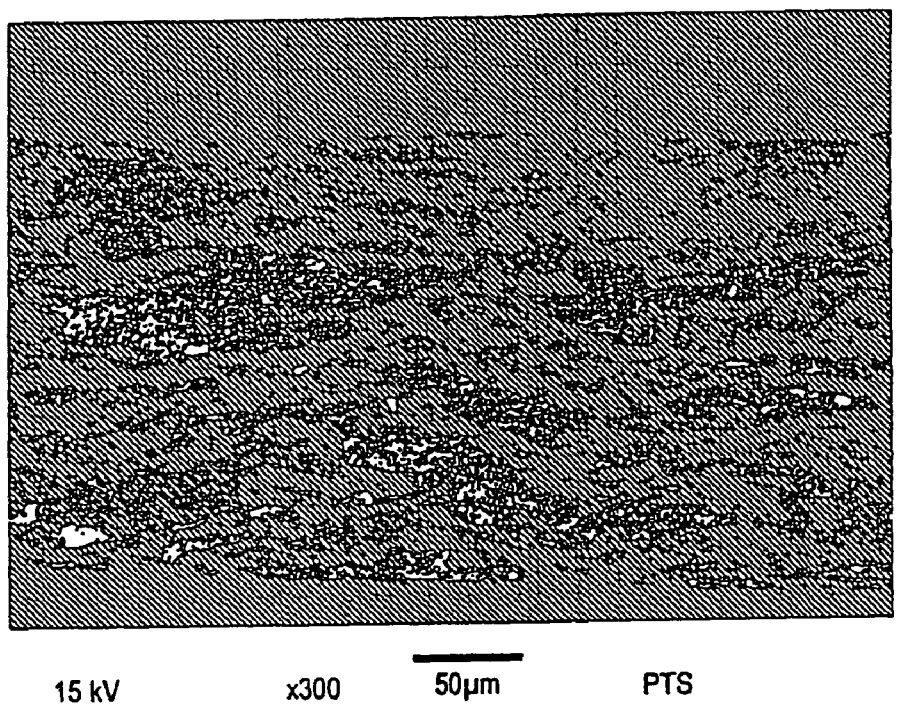
FIGS. 1-7 and 9 illustrate sectional views of microstructures according to various embodiments of the present invention.
Figure 2:
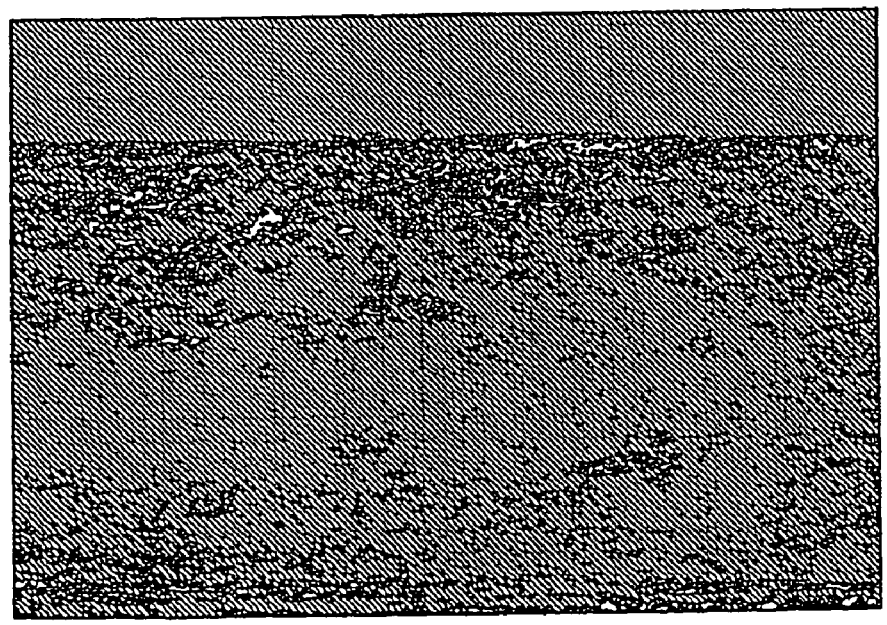

The green body obtained thereby is shown in section in FIG. 1. Then, this structure was sintered. Upon sintering, the microstructure shown in FIG. 2 is obtained.

Variants of Embodiment 1:

In one variant of the aforementioned embodiment, an alumina powder with a mean grain size (D50) of 3.9 µm is added. In addition, a coating of an alumina powder/latex mixture with a mean grain diameter (D50) of 0.8 µm is provided.

Figure 3:
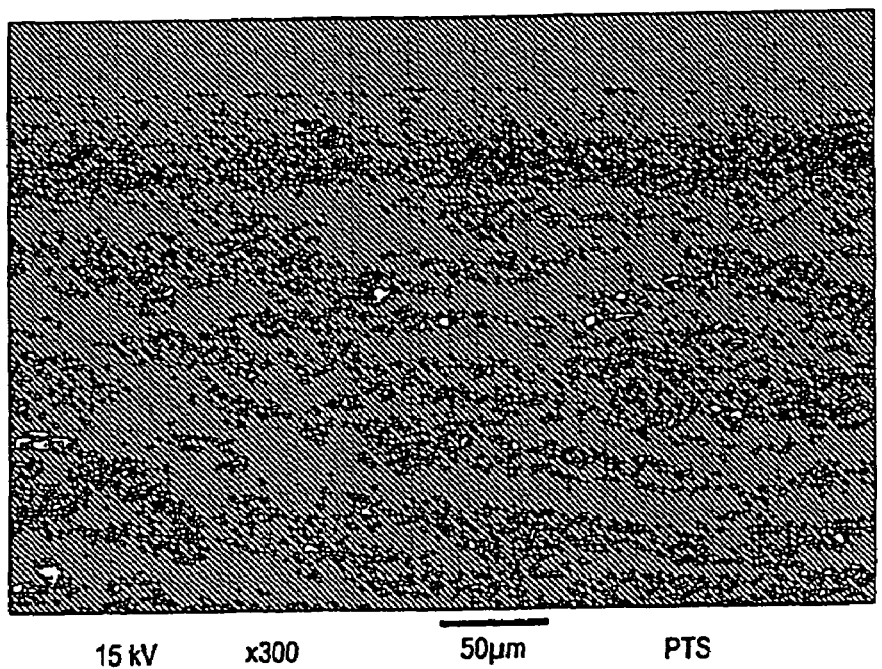

A corresponding sectional view of the green body formed here is shown in FIG. 3.

Figure 4:
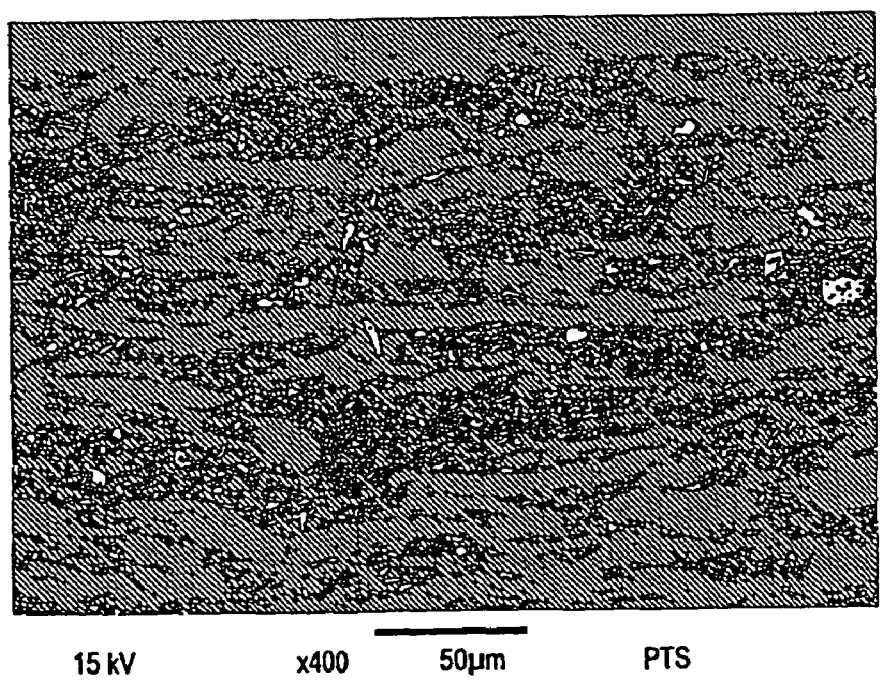

Variant 2 of Embodiment 1:

Another variant of the mixture is obtained in that here a bimodal alumina powder mixture was used, wherein on the one hand a mean grain size (D50) of 0.8 µm and on the other hand a mean grain size (D50) in the order of 3.9 µm was set. The corresponding green body is shown in FIG. 4.

Embodiment 2

For manufacturing a silicon-carbide-filled paper, 20 wt-% of eucalyptus sulfate pulp are mixed with 77 wt-% of silicon carbide powder with a mean grain size (D50) of 4.5 µm, based on the sheet weight. 3 wt-% of anionic latex, based on the sheet weight, are admixed. Now, 0.9 wt-% of a kationic polymer (Katiofast VFH), based on the filler, are added.

From this mixture, a circular laboratory sheet with a diameter of 20 cm and a weight per unit area of 320 g/m² is manufactured.

Figure 5:
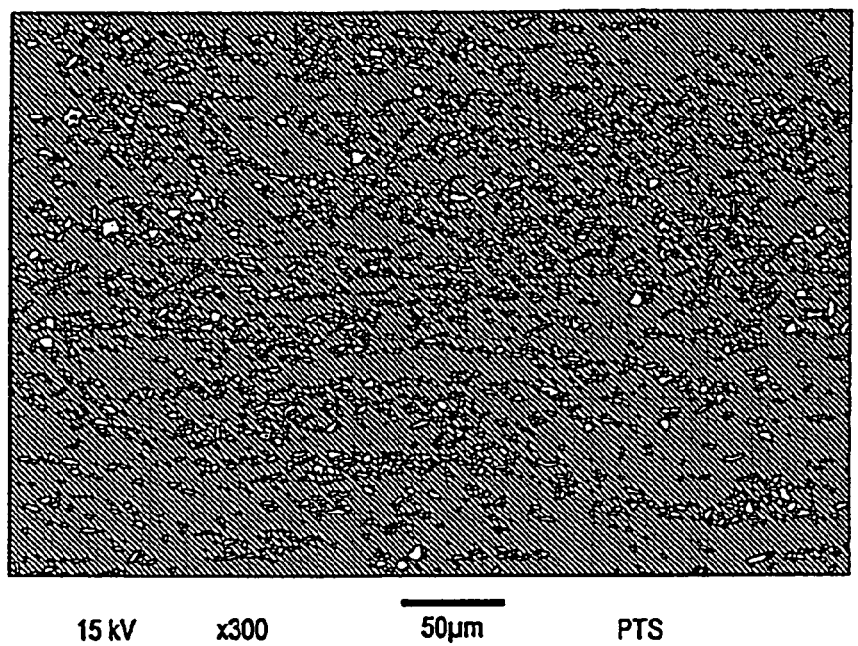
Figure 6:
Figure 7:

In the experiment, 400 g of a 0.5% pulp suspension were mixed in this embodiment with 7 g of 1% Katiofast. 7.7 g of silicon carbide powder and 7.5 g of 4% latex emulsion were added. From this mixture, a sheet was formed, and the sheet was dried. The associated green body is shown in section in FIG. 5. After the corresponding pyrolysis, the sectional view of FIG. 6 is obtained. Subsequently, a siliconization is performed by a further thermal treatment. Upon siliconization, the sectional view as shown in FIG. 7 is obtained.

Figure 8:
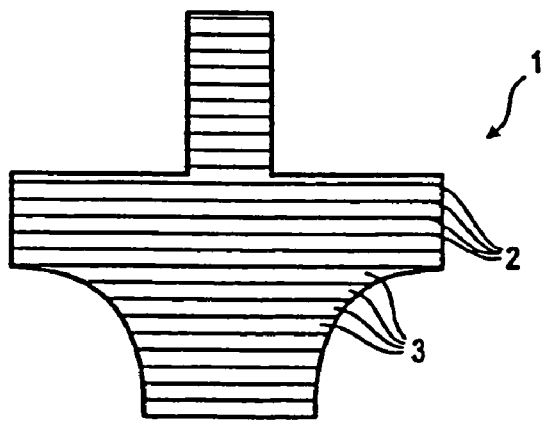
FIG. 8 illustrates a sectional view through laminate ceramics in accordance with the present invention.

FIG. 8 shows a laminate ceramics 1 comprising substrate layers 3 and connecting layers 2, which was manufactured by the LOM method. With the LOM method it is possible to create ceramic components in almost any three-dimensional shape.

Figure 9:
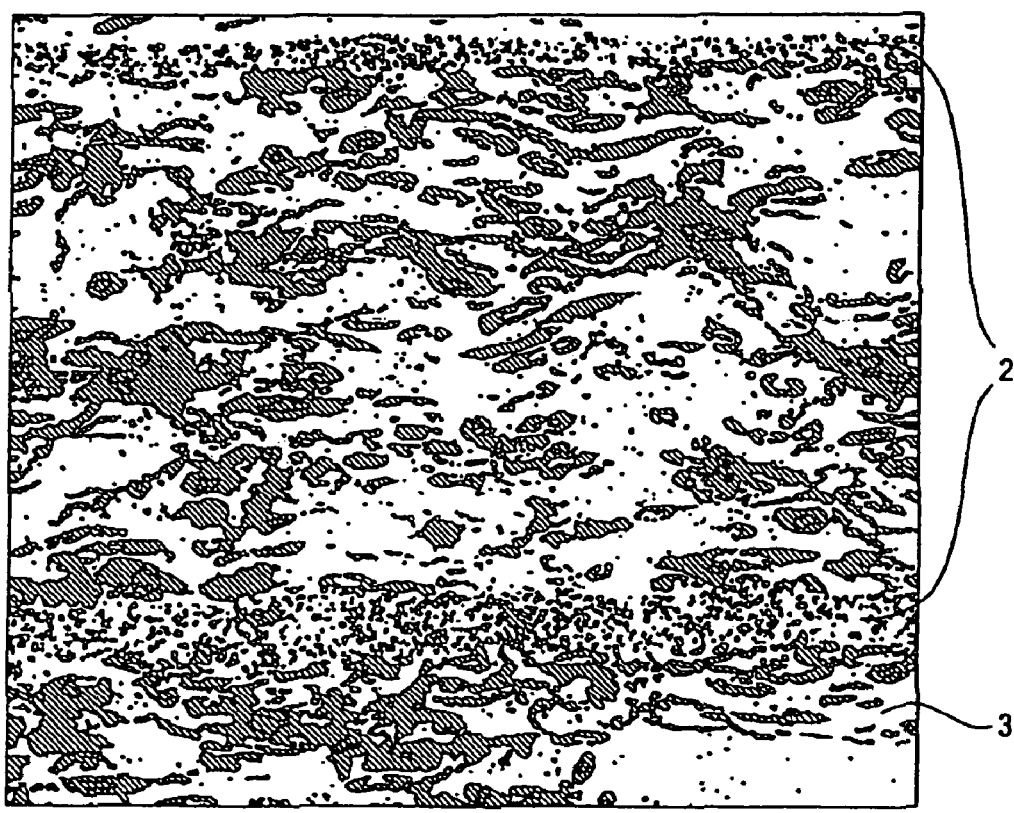

FIG. 9 shows a section through such laminate ceramics with substrate layers 3 and connecting layers 2.

The following embodiments of the inventive connecting layers and the inventive laminate ceramics illustrate an exemplary execution of the invention.

Embodiment 3

100 g of a heat-sealable, polyacrylate-based laminating adhesive present in an aqueous dispersion are diluted with 40 ml of distilled water, and 32 g of an $Al_2O_3$ powder (D50=0.8 µm), 2 g of a dispersing agent and 1 g of a defoaming agent are admixed. The substance is homogenized for 24 hours in a PE vessel with grinding balls and subsequently evacuated. The compound is applied by coating one side of a preceramic paper in a wet film thickness of 100 µm and dried in air. The adhesive film applied undergoes a drying shrinkage of 60%. After drying, a plurality of paper layers can be laminated mechanically at 180° C. The organic components of the laminates are burnt out in air in a temperature range of 350-800° C., the molded article then is sintered in air for 2 hours at 1600° C. After this process, ceramic components are obtained, whose microstructure is shown for instance in FIG. 9. After the temperature treatment, the adhesive compound has provided a ceramic layer with a thickness of about 10 µm and permanently connects the material layers.

Embodiment 4

100 g of a polymethylsilsequioxane, 20 g of a novolak phenol resin and 10 g of a pyrogenic silicic acid are mixed dry and homogenized for 24 hours in a PE vessel with grinding balls. The powder mixture then is spread on a surface of preceramic paper layers and molten at 90° C. for 15 min. A plurality of paper layers can mechanically be laminated at 140° C. After pyrolysis under a nitrogen atmosphere at 800° C. and subsequent liquid-phase siliconization at 1500° C. under a vacuum, components are obtained.

One possible board structure is corrugated board. Due to the method of the invention, corrugated boards with smaller flutes can also be realized here.

By selecting corresponding fillers and by corresponding application of pyrolysis and sintering steps, microstructure and properties can be adjusted specifically.

In addition, a subsequent infiltration with glasses, molten metals or polymers into the ceramic composite body can be employed.

The paper-filler system presented in accordance with the invention can also be applied to rapid prototyping methods.

The papers can also be processed to obtain laminates by the so-called Laminated Object Manufacturing (LOM).

Depending on the type of filler, the linear shrinkage of the paper usually is between 10 and 20%. The variation of the filler loading of the paper leads to the explicit adjustability of process-relevant material parameters, such as cuttability, shape or structural gradients. As a result, the properties of the ceramics manufactured from the preceramic paper or from the preceramic board can be varied in a wide range.

The invention claimed is:

1. A preceramic paper or board comprising a content of ceramic fillers between 30 and 95 wt-%, with the ceramic fillers having a particle size <30 µm, and
   latex or starch charged for retention of the fillers in combination with a charged polymer.

2. The paper or board according to claim 1, wherein it constitutes a composite ceramics in the form of a previously represented paper or board structure.

3. The paper or board according to claim 1, wherein the fillers are selected from a group including the following substances: carbides, nitrides, oxides, borides and/or zeolites.

4. The paper or board according to claim 3, wherein $Al_2O_3$, $ZrO_2$, SiC, $Si_3N_4$, $TiO_2$, $B_4C$, TiC, $TiB_2$ and/or mixtures thereof and/or glasses such as alumosilicates are used as fillers.

5. The paper or board according to claim 1, wherein the amount of latex in the preceramic paper or board lies between 0.2 and 15 wt-%.

6. The paper or board according to claim 1, wherein the amount of polymer in the preceramic paper or board lies between 0.05 and 5 wt-%.

7. The paper or board according to claim 1, wherein long or short ceramic fibers, fibrous tissue, platelets and/or whiskers are added as reinforcing elements.

8. The caper or board according to claim 1, wherein sulfate pulp, sulfite pulp, TMP (thermomechanical pulp) and/or CTMP (chemithermomechanical pulp) are used as fibrous material.

9. The paper or board according to claim 1, wherein the thickness of the preceramic paper or board structure lies in the range from 50 to 500 µm.

10. The paper or board according to claim 1, wherein the weight of the preceramic paper or board structure lies in the range from 100 to 500 g/m².

11. The paper or board according to claim 1, wherein the ceramics is infiltrated with glasses, molten metals or polymers.

12. The paper or board according to claim 1, comprising connecting layers of either thermoplastic polymers solid at room temperature or silicone/phenol resins below their cross-linking temperature.

13. The paper or board according to claim 12, wherein the polymers comprise polyacrylates, polyurethanes, polyolefins and their copolymers.

14. The paper or board according to claim 12, wherein the connecting layer contains filler particles, whose amount is up to 90 wt-%, with the filler particles having mean particle sizes smaller than 50 µm.

15. The paper or board according to claim 14, wherein metals/semimetals of main groups II to IV, of the subgroups including lanthanides and their alloys, and their crystalline and amorphous compounds with non-metals of the second period excluding fluorine and neon of the Periodic Table are used as filler particles.

16. The paper or board according to claim 15, wherein mixtures and mixed compounds of the substances are used as filler particles.

17. The paper or board according to claim 14, wherein the homogeneous distribution of the filler particles is improved by using as corresponding processing aids, dispersing agents and defoaming agents in an amount of 0 to 2 wt-% each.

18. The paper or board according to claim 12, wherein the connecting layer is applied onto the substrate to be connected by usual coating techniques in layer thicknesses of 1 to 500 μm, which substrate can be converted to ceramics by a suitable temperature treatment.

19. The paper or board according to claim 12, wherein the connecting layer is briefly heated above the $T_m$ of the polymers and permanently connects layers upon solidification.

20. The paper or board according to claim 12, wherein the connecting layer is present after a laminating process between individual substrate layers, whereby an alternating material structure is obtained.

21. The paper or board according to claim 20, wherein the substrate layers are made of preceramic paper or preceramic board.

22. The ceramics according to claim 20, wherein the laminate ceramics comprise at least two material layers and at least one connecting layer.

23. The paper or board according to claim 12, wherein the polymers are thermally decomposed in a subsequent temperature treatment, advantageously between 200 and 1400° C.; the treatment is effected up to the point where no more change in weight occurs during the temperature treatment, independent of the used polymer, the atmosphere and the residue achieved.

24. The caper or board according to claim 14, wherein the connecting layer is converted to a ceramic intermediate layer by a temperature treatment in air or under an inert atmosphere, with surface reactions taking place between polymer residue, filler particles, substrate surfaces and combinations thereof.

25. The paper or board according to claim 24, wherein the temperature treatment takes place in temperature ranges in which the filler particles used have an increased surface reactivity, typically in the range from 1000-2000° C.

26. The paper or board according to claim 23, wherein the temperature treatments are performed in one step.

27. The paper or board according to claim 12, wherein the thickness of the connecting layer can be varied by the temperature treatments, typically in a range from 0.5 to 200 μm.

28. The paper or board according to claim 12, wherein the connecting layer is applied onto a substrate as a protection against an atmospheric or chemical attack.

29. The paper or board according to claim 12, wherein the connecting layer is applied onto a substrate as a protective layer against a mechanical influence.

30. A method for manufacturing a ceramics according to claim 1, comprising the following steps:
fibrous material and filler are mixed and processed to obtain a paper or board,
the paper or board produced is subjected to pyrolysis or a binder removal process at temperatures up to 1200° C., and/or
to a sintering process at temperatures between 1000° C. and 2000° C.

31. The method according to claim 30, wherein before the pyrolysis step, the raw paper or raw board produced is subjected to a forming step, for instance to fluting or corrugating.

32. The method according to claim 30, wherein individual layers of papers or boards are couched, in order to obtain thicker layers.

33. The method according to claim 30, wherein differently structured types of ceramic paper or board are couched with each other.

34. The method according to claim 30, wherein ceramic slip is applied onto the paper or board by means of paper coating methods.

35. The method according to claim 34, wherein various ceramic slip layers are coated on the paper or board such that a multilayer system is obtained.

36. The method according to claim 30, wherein layers are applied in the green or sintered condition by means of a sol-gel technique.

37. The method according to claim 30, wherein an infiltration with glasses, molten metals or polymers into the ceramics is employed.

38. The method according to claim 30, wherein several layers of the paper or board produced are connected by connecting layers.

39. The paper or board according to claim 16, wherein alumosilicates and/or glasses are used as filler particles.

\* \* \* \* \*